(12) United States Patent
Szymański

(10) Patent No.: US 11,505,100 B2
(45) Date of Patent: Nov. 22, 2022

(54) FRAME FOR SEATS IN PUBLIC TRANSPORT VEHICLES

(71) Applicant: Maciej Szymański, Poznan (PL)

(72) Inventor: Maciej Szymański, Poznan (PL)

( * ) Notice: Subject to any disclaimer, the term of this patent is extended or adjusted under 35 U.S.C. 154(b) by 0 days.

(21) Appl. No.: 17/296,095

(22) PCT Filed: Nov. 19, 2019

(86) PCT No.: PCT/PL2019/000104
§ 371 (c)(1),
(2) Date: May 21, 2021

(87) PCT Pub. No.: WO2020/106166
PCT Pub. Date: May 28, 2020

(65) Prior Publication Data
US 2022/0009390 A1   Jan. 13, 2022

(30) Foreign Application Priority Data
Nov. 23, 2018  (PL) .......................................... 427882

(51) Int. Cl.
*B60N 2/24* (2006.01)
*B60N 2/68* (2006.01)
*A47C 7/28* (2006.01)

(52) U.S. Cl.
CPC .............. *B60N 2/68* (2013.01); *B60N 2/242* (2013.01); *A47C 7/282* (2013.01)

(58) Field of Classification Search
CPC ............ A47C 3/12; A47C 7/282; B60N 2/242
(Continued)

(56) References Cited

U.S. PATENT DOCUMENTS 3,677,601 A * 7/1972 Morrison .................. A47C 7/18
                                                       297/452.17
5,318,348 A * 6/1994 Hess ...................... A47C 31/023
                                                       297/440.11
(Continued)

FOREIGN PATENT DOCUMENTS

CN        107074132 A  *  8/2017  ............. A47C 1/024
DE         19839166 C1 * 12/1999  ............. A47C 23/18
(Continued)

OTHER PUBLICATIONS

International Search Report issued in connection with PCT/PL2019/000104 dated Feb. 21, 2020.
(Continued)

*Primary Examiner* — Timothy J Brindley
(74) *Attorney, Agent, or Firm* — Dennemeyer & Associates; Steven M. Shape

(57) ABSTRACT

The subject of the invention is a frame for seats in public transport vehicles, used in vehicles such as trams, school buses or other vehicles for transporting passengers on short distances, with low requirements for the comfort of travel. A frame for a seat in public transport vehicles in the form of shaped bent profile that creates a backrest and a seat pan, to which brackets for the seat pan and backrest pillows are attached, wherein the profile (1) in a section perpendicular to its longitudinal axis has an outline similar to an ellipse and its longer section axis is tilted upwards in an outside direction from the vertical plane, which forms the frame's perpendicular bisector, by angle α ranging from 10-30°, preferably 20°.

2 Claims, 5 Drawing Sheets

(58) Field of Classification Search
USPC .................................................... 297/452.2
See application file for complete search history.

(56) References Cited

U.S. PATENT DOCUMENTS

| | | | | |
|---|---|---|---|---|
| 5,582,463 | A * | 12/1996 | Linder | A47C 5/06 |
| | | | | 297/452.56 |
| 6,027,167 | A | 2/2000 | Blomdell | |
| 6,030,040 | A * | 2/2000 | Schmid | A47C 5/06 |
| | | | | 297/226 |
| 6,059,369 | A | 5/2000 | Bateson | |
| 6,254,190 | B1 * | 7/2001 | Gregory | A47C 31/023 |
| | | | | 297/440.11 |
| 6,439,665 | B1 * | 8/2002 | Cvek | A47C 7/16 |
| | | | | 297/452.64 |
| 6,779,849 | B1 * | 8/2004 | Harper | A47C 7/282 |
| | | | | 297/440.11 |
| 7,740,320 | B2 * | 6/2010 | Chiang | A47C 4/03 |
| | | | | 297/440.22 |
| 8,317,269 | B2 * | 11/2012 | Smith | A47C 7/54 |
| | | | | 297/440.11 |
| 8,317,270 | B2 * | 11/2012 | Tseng | A47C 7/40 |
| | | | | 297/440.11 |
| 9,126,519 | B2 * | 9/2015 | Uebelacker | B60N 2/7011 |

FOREIGN PATENT DOCUMENTS

| | | | | |
|---|---|---|---|---|
| DE | 202007011802 U1 * | 11/2007 | | A47C 3/04 |
| EP | 1332914 B1 | 8/2003 | | |
| EP | 2366584 A1 * | 9/2011 | | B60N 2/686 |
| EP | 2366584 A1 | 9/2011 | | |
| EP | 2789499 A1 * | 10/2014 | | B60N 2/68 |
| EP | 3398807 A1 | 11/2018 | | |
| JP | 2014091439 B2 | 5/2014 | | |
| PL | 195798 B1 | 10/2007 | | |
| WO | 2013142798 A1 | 9/2013 | | |

OTHER PUBLICATIONS

Search Report issued in connection with Polish Patent Application No. 427882 dated Mar. 22, 2022.

* cited by examiner

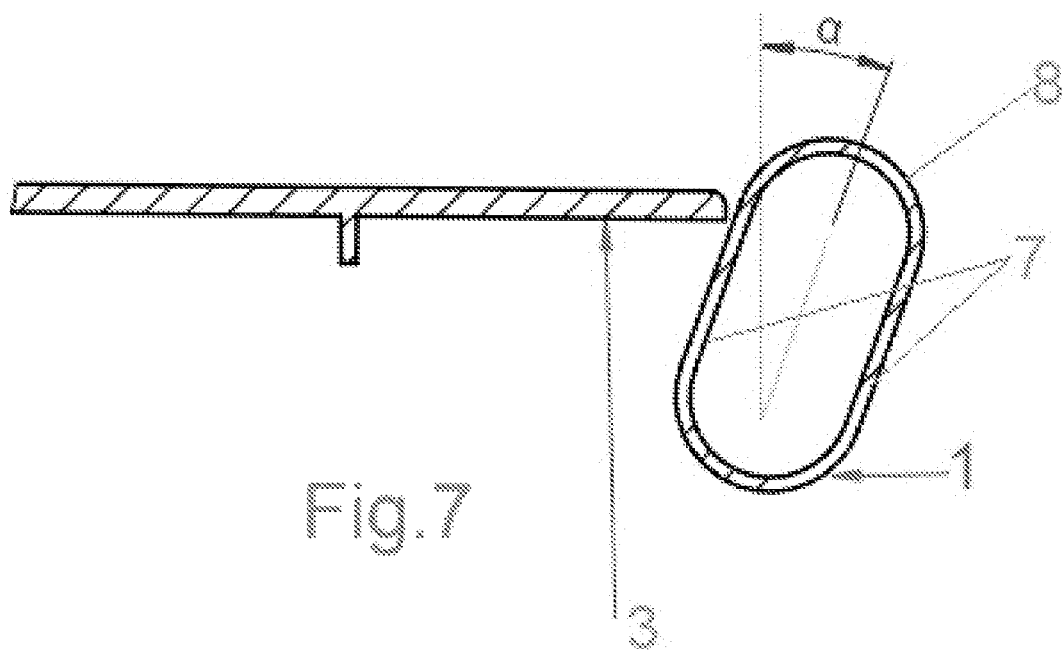

FRAME FOR SEATS IN PUBLIC TRANSPORT VEHICLES

BACKGROUND OF THE INVENTION

The subject of the invention is a frame for seats in public transport vehicles, used in vehicles such as trams, school buses or other vehicles for transporting passengers on short distances, with low requirements for the comfort of travel.

In the currently existing solutions, the frame for seats in public transport vehicles is an ergonomically shaped bent profile that forms a backrest and a seat. Backrest and seat pillows are attached to this profile. The existing solutions use profiles with a ring section—circular or resembling a square.

Such solutions require reinforcements in the section where the seat transits into the backrest, which raises the vehicle's mass and creates a gap between the pillows' side walls and the profile, where dirt can accumulate. Keys, credit cards or change can potentially be trapped in such places. Depending on the thickness of the used fabric, the gap between the seat and the upholstered element can have different dimensions. The profiles used in this solution make for an unsightly design.

The essence of the invention, namely a frame for a seat in public transport vehicles in the form of shaped bent profile that creates a backrest and a seat pan, to which brackets for the seat pan and backrest pillows are attached consists in that the profile in a section perpendicular to its longitudinal axis has an outline similar to an ellipse, characterized in that its longer section axis is tilted upwards in an outside direction from the vertical plane, which forms the frame's perpendicular bisector, by angle α ranging from 10-30°, preferably 20°.

Preferably, the profile is made from two flat surfaces connected with arching surfaces.

Using the solution according to the invention, the following technical and utilitarian effects were obtained:
- the frame's increased strength caused by the distribution of stresses within the profile,
- the frame's reduced weight due to its increased strength, translating into economic effects of the vehicle's design and operation, such as savings in construction materials and fuel materials,
- the possibility of use of pillows with inclined side surfaces with the seat's frame which, once occupied by a passenger, wedge into the profile's inclined surfaces thus eliminating the gap present in the existing solutions, which prevents the accumulation of dirt in the gaps,
- improved aesthetics of the seat's frame,
- the upholstered elements are propped along the entire profile, because the inclined surfaces of side profiles constitute linear supports for the upholstered elements,
- the need to install additional props for upholstered elements in the seat's frame is eliminated, which reduces the seat's mass and lowers production costs,
- the fabric's thickness and the method of application of upholstered elements are not of key importance,
- the modification of the dimensions of upholstered elements by using thick fabrics does not affect the possibilities of installing these elements in the seat's frame. In the existing solution, the modification of dimensions may render it impossible to install an element.

BRIEF DESCRIPTION OF THE DRAWINGS

The subject of the invention in an exemplary, but not limiting embodiment is shown in a drawing in which
FIG. 7 shows the detail D from FIG. 4

DETAILED DESCRIPTION

Figure 1:
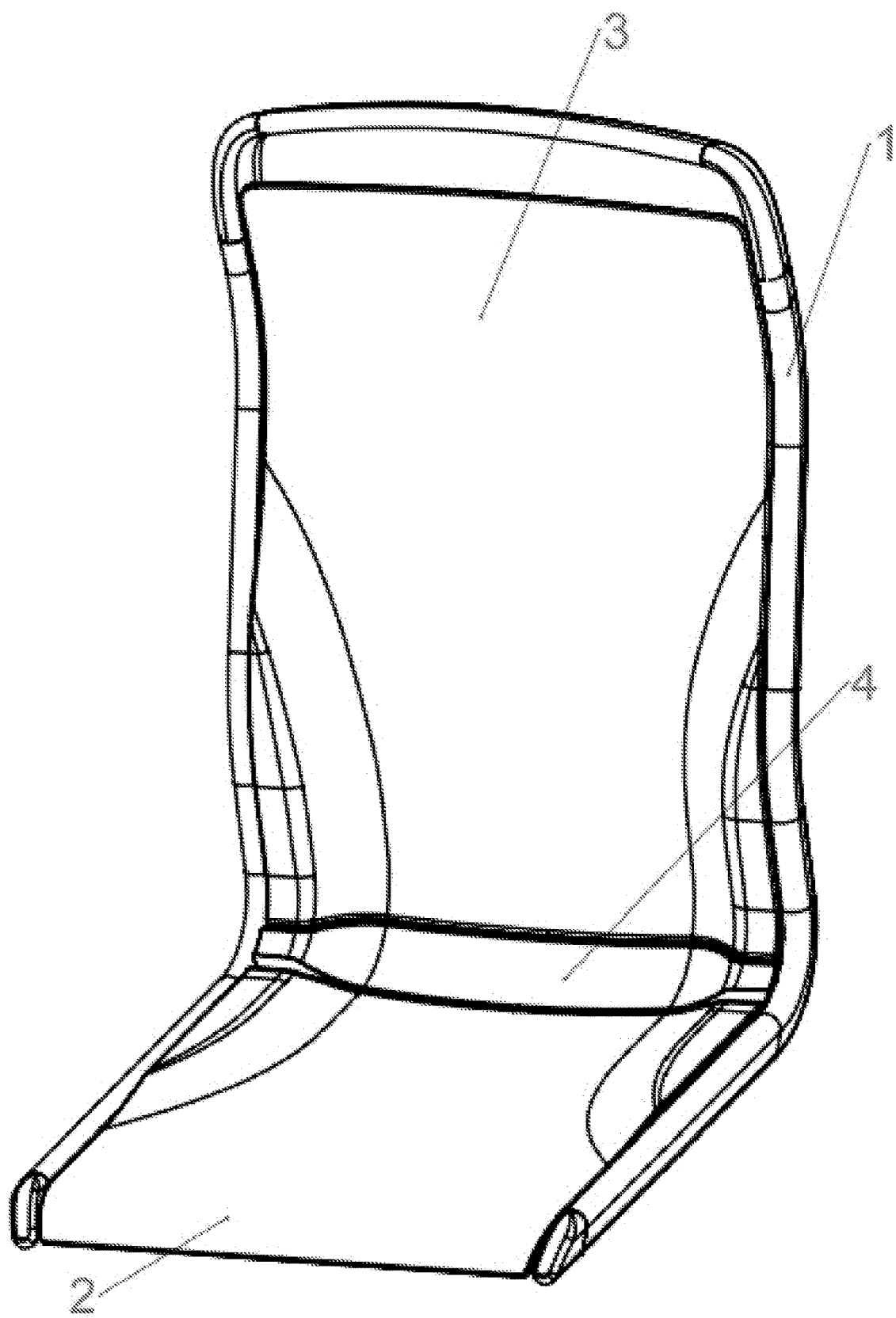
FIG. 1 shows the seat's frame in a spatial view.
Figure 2:
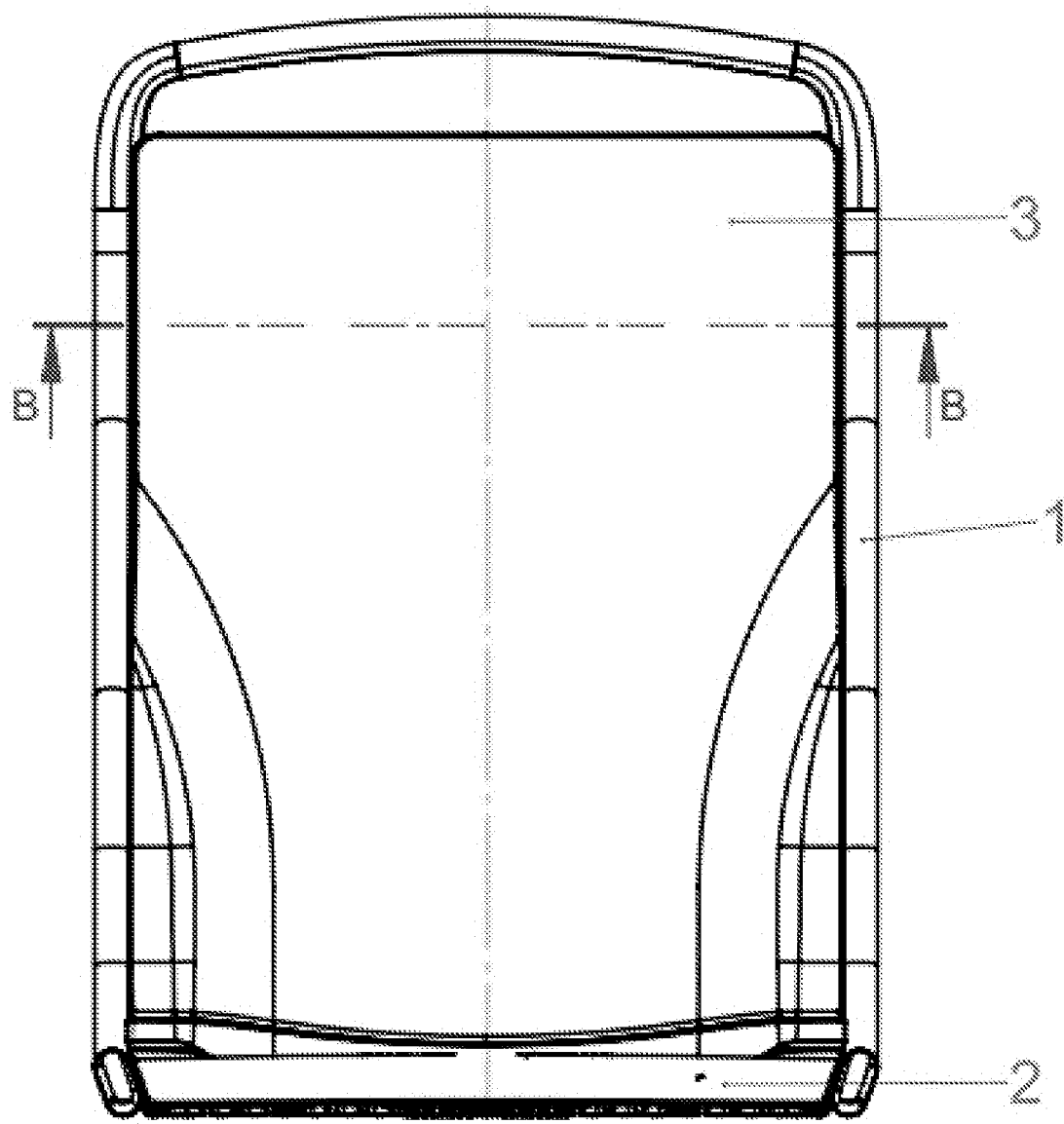
FIG. 2 shows the frame making a backrest.
Figure 3:
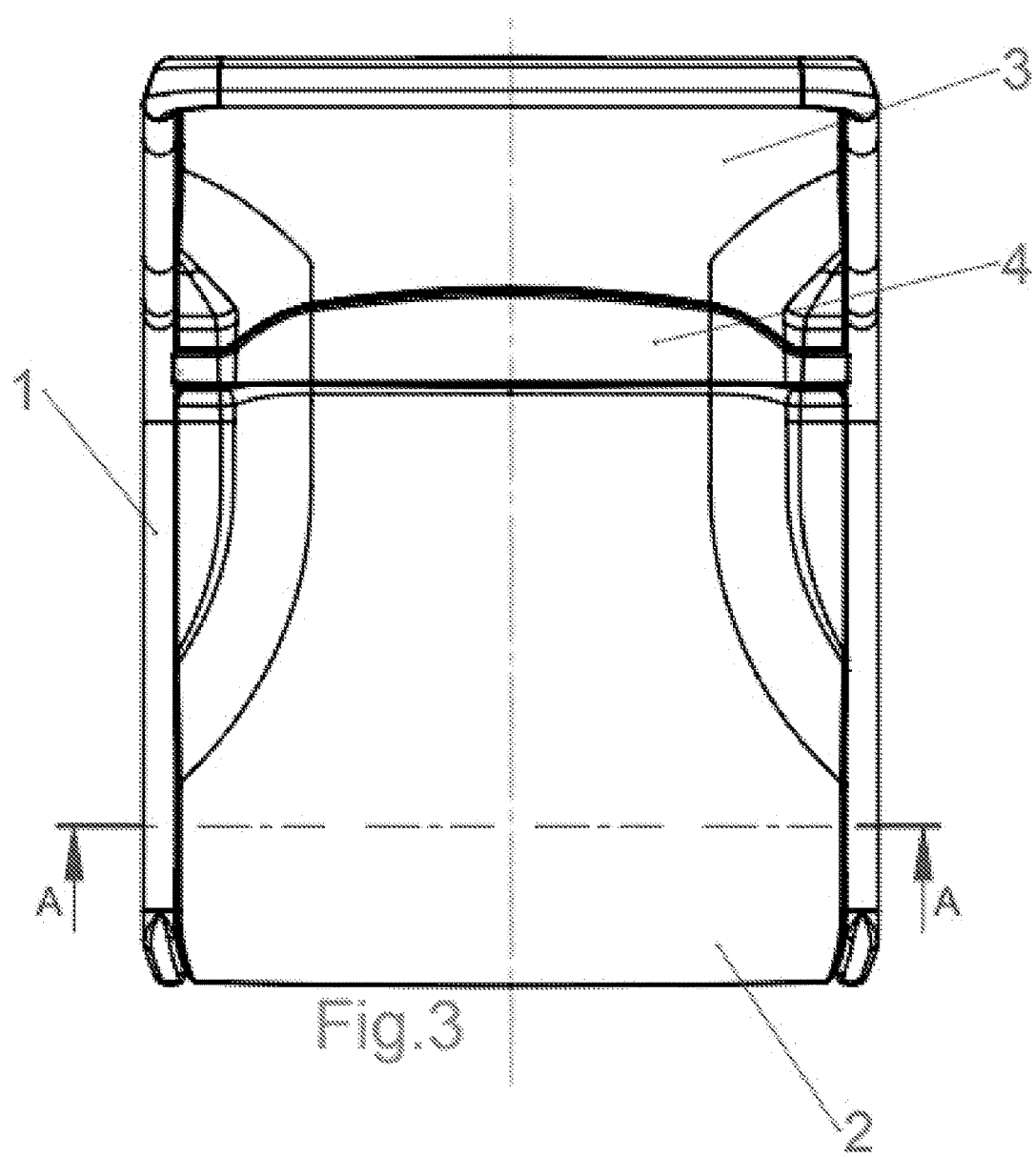
FIG. 3 shows the frame making a seat.
Figure 4:
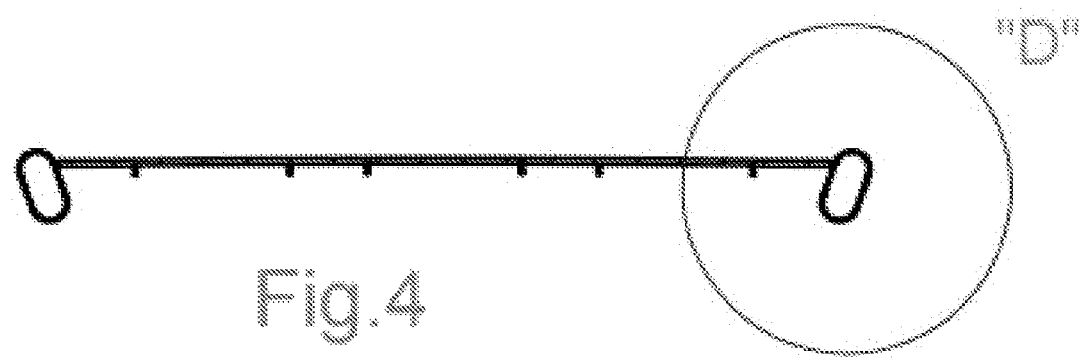
FIG. 4 shows the frame's section in A-A plane from FIG. 3.
Figure 5:
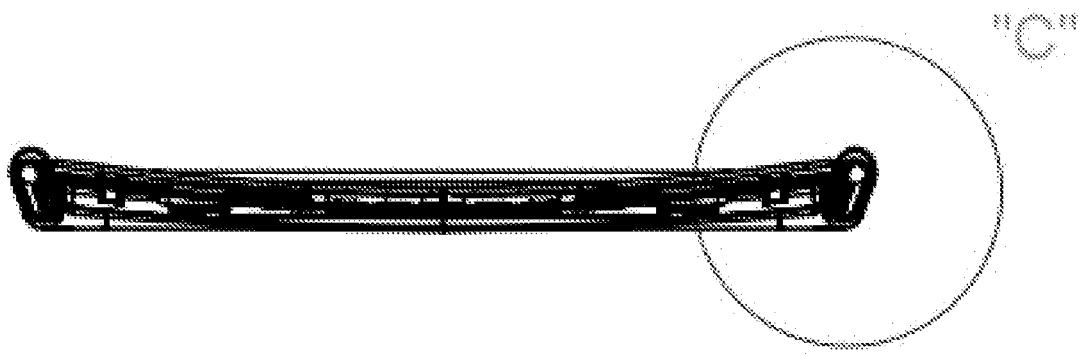
FIG. 5 shows the frame's section in B-B plane from FIG. 2.
Figure 6:
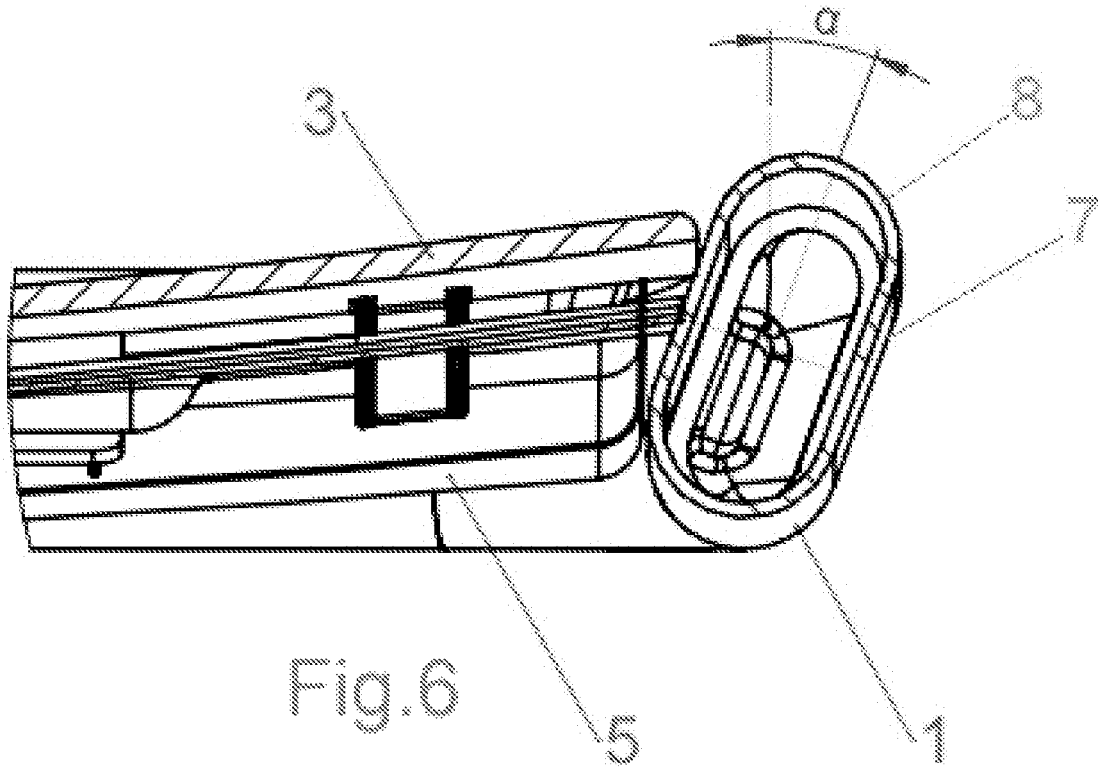
FIG. 6 shows the detail C from FIG. 5.

The frame for seats in public transport vehicles is an ergonomically shaped bent L-profile. This profile makes an element of the backrest 3 and the seat pan 2, to which brackets 4 of pillows 5 of the seat pan 2 and the backrest 3, not shown in the drawing, are attached. In the section in plane perpendicular to its longitudinal axis the profile 1 has an outline similar to an ellipse and its longer section axis is tilted upwards in an outside direction from the vertical plane, which forms the frame's perpendicular bisector, by angle α ranging from 10-30°, preferably 20°.

There exist variations of the embodiment where the profile 1 is made from two flat surfaces 7, connected with arching surfaces 8.

Pillows 5 of the seat pan 2 and pillows of the backrest 3 are introduced into a frame shaped in this manner Thanks to their flexibility and the inclined side surface, the pillows 5, when occupied by passengers, tightly adhere to the internal surfaces of profile 1, thus eliminating the gap.

The invention claimed is:

1. A frame for a seat in public transport vehicles in the form of a shaped bent profile that creates a backrest and a seat pan, to which brackets for the seat pan and backrest pillows are attached, wherein the profile (1), in portions of the frame along opposite sides of the seat around attachments to the brackets for seat pan and backrest pillows, has a cross section substantially shaped similar to an ellipse, where a longer section axis of the elliptical shape is tilted upwards in an outside direction from the vertical plane, which forms the frame's perpendicular bisector, by angle α ranging from 10-30°, preferably 20°.

2. The frame according to claim 1, wherein characterized in that the profile (1) is made from two flat surfaces (7), connected with arching surfaces (8).

* * * * *